No. 609,080. Patented Aug. 16, 1898.
R. W. CHURCHILL.
BICYCLE TIRE.
(Application filed Apr. 26, 1898.)
(No Model.)
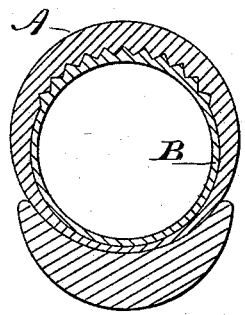
FIG_1_
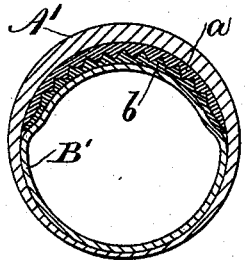
FIG_2_
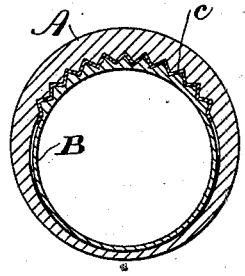
FIG_3_
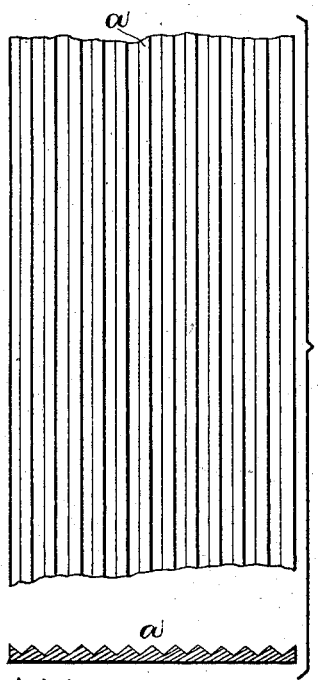
FIG_4_
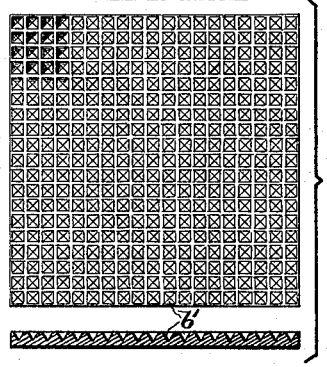
FIG_5_
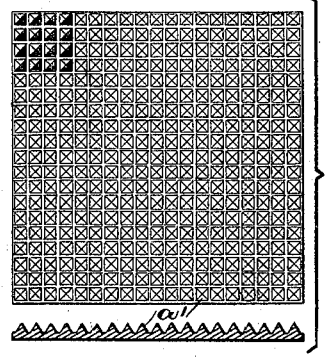
FIG_6_
WITNESSES
INVENTOR

UNITED STATES PATENT OFFICE.

ROBERT W. CHURCHILL, OF PEABODY, MASSACHUSETTS.

BICYCLE-TIRE.

SPECIFICATION forming part of Letters Patent No. 609,080, dated August 16, 1898.

Application filed April 26, 1898. Serial No. 678,902. (No model.)

*To all whom it may concern:*

Be it known that I, ROBERT W. CHURCHILL, a citizen of the United States, residing at South Peabody, in the county of Essex and State of Massachusetts, have invented certain new and useful Improvements in Bicycle-Tires; and I do hereby declare the following to be a full, clear, and exact description of the invention, such as will enable others skilled in the art to which it appertains to make and use the same.

My invention consists in an improved pneumatic tire, and particularly a tire which will automatically close punctures.

The object of my invention is to make a tire which when accidentally punctured in use will close the puncture and prevent leakage of air.

My invention consists of the pneumatic tire which will be hereinafter described and claimed.

The accompanying drawings illustrate my invention, in which—

Figure 1 is a cross-section of the tire and rim, showing the preferred form of my invention. Figs. 2 and 3 show modified forms. Fig. 4 is a face view of the preferred form of the surface configuration of the puncture-closing strips. Figs. 5 and 6 illustrate a modified form of the puncture-closing strips.

In Fig. 1 I have shown the preferred form of my invention, which consists in an outer tube A, provided on its inside with a surface which is ribbed. The inner tube B is provided with an outer ribbed surface, which corresponds to the inner ribbed surface of the outer tube. These ribbed surfaces may extend around the whole circumference of the tire or they may be limited to the outer portion or tread of the tire, as desired.

In Fig. 2 I have shown a plain outer tube A' and a plain inner tube B' and interposed between them puncture-closing strips *a b*, having surfaces provided with complemental grooves or projections.

In Fig. 3 I have shown the outer tube A and the inner tube B of the same form as shown in Fig. 1, but with an interposed strip *c* of soft thin vulcanized rubber laid between them.

Figs. 4, 5, and 6 illustrate different forms of surface configuration for the puncture-closing strips, whether these strips be integral parts of the tire-tubes or separate therefrom.

In Fig. 4 the surface configuration of the strip *a* consists in longitudinal grooves and projections, which are adapted to engage corresponding projections and grooves in the complemental puncture-closing strip.

In Fig. 6 I have shown a strip *a'* provided with pyramidal projections, which are adapted to engage a complemental strip *b'* (shown in Fig. 5) provided with corresponding pyramidal recesses, which will fit the projections of the other strip.

While I have shown these forms of puncture-closing strips, I do not desire to limit myself to them; but I consider that my invention is generic to any form of strips which are provided, respectively, with projections on the one and recesses on the other, which fit into each other, for it is obvious that the same results would be secured by any form of projection and recess.

The puncture-closing strips are made of soft vulcanized rubber and may be integral with the tubes, as shown in Figs. 1 and 3, or separate therefrom, as shown in Fig. 2.

The inner strip is preferably made with its projections of slightly-smaller size than those of the outer strip, so that when rolled into the form they take in position in the tire they fit together.

In use, the inner tube being inflated, the rubber of the inner puncture-closing strip is compressed into the projections and recesses of the outer puncture-closing strip, or in the form shown in Fig. 3 the rubber of the strip *c* is compressed between the projections of the two strips. The rubber of the inner puncture-closing strip is thus compressed bodily, so that when the tire is punctured and the puncturing thing withdrawn the pressure of the air upon portions of the strip adjacent to the puncture, together with the inherent elasticity of the rubber itself due to its compression, presses the rubber together at the puncture, whereby leakage of the air is entirely prevented.

My invention is capable of being applied to common double-tube tires without necessitating any change whatever therein, and it avoids the undesirable introduction of puncture-repairing fluids into the tires or the irritating delays incident to plugging tires. Moreover, it avoids the weight and inelasticity of puncture-proof tires and produces a light highly-elastic resilient tire.

Having thus described my invention, what I claim as new, and desire to secure by Letters Patent of the United States, is—

1. A pneumatic tire having outer and inner tubes and intermediate complemental puncture-closing projections and recesses adapted to fit into each other, substantially as described.

2. A pneumatic tire having outer and inner tubes and intermediate complemental puncture-closing strips provided respectively with projections and recesses adapted to fit into each other, substantially as described.

3. A pneumatic tire having outer and inner tubes, and intermediate complemental puncture-closing strips provided respectively with longitudinal grooves and recesses adapted to fit into each other, substantially as described.

In testimony whereof I affix my signature in presence of two witnesses.

ROBERT W. CHURCHILL.

Witnesses:
PURVIS F. SMITH,
JOHN W. HOLLEY.